United States Patent
Wood et al.

(10) Patent No.: US 8,083,487 B2
(45) Date of Patent: Dec. 27, 2011

(54) ROTARY AIRFOILS AND METHOD FOR FABRICATING SAME

(75) Inventors: Trevor Howard Wood, Clifton Park, NY (US); Anurag Gupta, Clifton Park, NY (US); Ludwig Christian Haber, Rensselaer, NY (US); Philip Roger Gliebe, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 1474 days.

(21) Appl. No.: 11/774,762

(22) Filed: Jul. 9, 2007

(65) Prior Publication Data
US 2009/0013532 A1    Jan. 15, 2009

(51) Int. Cl.
*F01D 5/14* (2006.01)
(52) U.S. Cl. ............ 416/223 R; 416/228; 416/231 R; 416/235; 416/236 R; 416/238
(58) Field of Classification Search .............. 416/223 R, 416/228, 231 R, 235, 236 R, 238
See application file for complete search history.

(56) References Cited

U.S. PATENT DOCUMENTS

| | | | |
|---|---|---|---|
| 1,366,635 A * | 1/1921 | Conway | 416/236 R |
| 1,717,745 A * | 6/1929 | Tismer | 416/228 |
| 2,238,749 A * | 4/1941 | Peltier | 416/203 |
| 2,265,788 A * | 12/1941 | Wolf, Sr. et al. | 416/236 R |
| 2,899,128 A * | 8/1959 | Vaghi | 415/222 |
| 2,962,101 A * | 11/1960 | Vaghi | 416/235 |
| 3,084,505 A | 4/1963 | Cherchi | |
| 4,108,573 A * | 8/1978 | Wagner | 416/236 A |
| 4,318,669 A | 3/1982 | Wennerstrom | |
| 4,714,408 A * | 12/1987 | Abe | 416/91 |
| 4,786,016 A | 11/1988 | Presz, Jr. et al. | |
| 4,813,633 A | 3/1989 | Werle et al. | |
| 4,813,635 A | 3/1989 | Paterson et al. | |
| 4,830,315 A | 5/1989 | Presz et al. | |
| 5,860,626 A * | 1/1999 | Moser | 244/200 |
| 6,733,240 B2 | 5/2004 | Gliebe | |
| 6,948,910 B2 * | 9/2005 | Polacsek | 416/1 |

* cited by examiner

*Primary Examiner* — Igor Kershteyn
(74) *Attorney, Agent, or Firm* — David J. Clement, Esq.; Armstrong Teasdale LLP (57) ABSTRACT

A method of fabricating an airfoil is provided. The method includes fabricating at least one airfoil including a suction side and a pressure side coupled together at a leading edge and a trailing edge, wherein the airfoil includes a plurality of first and second chord sections each extending between the trailing and leading edges, wherein at least one of the first chord sections extends outward from the pressure side of the airfoil at the trailing edge, and at least one of the second chord sections extends outward from the suction side of the airfoil at the trailing edge.

15 Claims, 8 Drawing Sheets

ROTARY AIRFOILS AND METHOD FOR FABRICATING SAME

BACKGROUND OF THE INVENTION

This invention relates generally to rotary machines, and more specifically to airfoils used with rotary machines.

At least some known rotary machines such as, but not limited to, aircraft engines, gas turbine engines, and steam turbine engines, include a plurality of rotating airfoils which channel an airflow downstream. As a result, a wake flow may be generated and channeled downstream where it may impinge against an object downstream from the airfoils. Depending on the object, wake flow impingement may generate noise and/or aeromechanical loading. In some known engines, noise may be generated by either the upstream rotating airfoil wake impinging on a stator or rotor component downstream from the rotating airfoil, or the upstream stator component wake impinging on a rotating airfoil downstream from the stator component. Moreover, in some known engines, the wake flow may contain non-uniform temperature distributions.

The generation of such wake flow may result in a loss of engine performance and engine efficiency. Reduction of the amplitude of the wake flow may reduce the noise and the aeromechanical loading generated when the wake impinges against a downstream object. At least some known methods of reducing the amplitude of the wake flow and/or providing thermal uniformity of the wake flow include increasing the distance between the upstream airfoil and the downstream object. This increased distance mixes the wake flow and thus reduces the amplitude of the wake flow.

Increasing the distance between upstream airfoil and the downstream object increases the size, weight, and cost of the engine, and thereby reduces the efficiency and performance of the engine.

BRIEF DESCRIPTION OF THE INVENTION

In one aspect, a method of fabricating an airfoil is provided. The method includes fabricating at least one airfoil including a suction side and a pressure side coupled together at a leading edge and a trailing edge, wherein the airfoil includes a plurality of first and second chord sections each extending between the trailing and leading edges, wherein at least one of the first chord sections extends outward from the pressure side of the airfoil at the trailing edge, and at least one of the second chord sections extends outward from the suction side of the airfoil at the trailing edge.

In another aspect, an airfoil is provided. The airfoil includes a suction side and a pressure side coupled together at a leading edge and a trailing edge, the airfoil is defined by a plurality of first chord sections and a plurality of second chord sections, at least one of the first chord sections extends outward from the airfoil pressure side at the trailing edge, and at least one of the second chord sections extends outward from the airfoil suction side at the trailing edge.

In a further aspect, a rotor assembly for use in an engine is provided. The rotor assembly includes a rotor disk and a plurality of rotor blades coupled to the rotor disk. The rotor blades comprising an airfoil portion comprising a suction side and a pressure side coupled together at a leading edge and a trailing edge, the airfoil portion is defined by a plurality of first chord sections and a plurality of second chord sections, at least one of the first chord sections extends outward from the airfoil pressure side and at least one of the second chord sections extends outward from the airfoil suction side.

DETAILED DESCRIPTION OF THE INVENTION

The present invention generally provides exemplary apparatus and methods for fabricating an airfoil for use in a turbine engine. The embodiments described herein are not limiting, but rather are exemplary only. It should be understood that the present invention may apply to any type of airfoil or aerodynamic surface, such as, but not limited to, fan blades, rotor blades, stator blades, ducted fan blades, unducted fan blades, struts, vanes, exhaust ducts, and/or nozzle assemblies. More specifically, the present invention may apply to any airfoil, or aerodynamic surface, that generates a wake downstream from the airfoil.

Although the present invention described herein is described in connection with a turbine engine, it should be apparent to those skilled in the art that, with appropriate modification, the apparatus and methods of the present invention can be suitable for any device including airfoils that generate wakes downstream from the airfoil.

Figure 1:
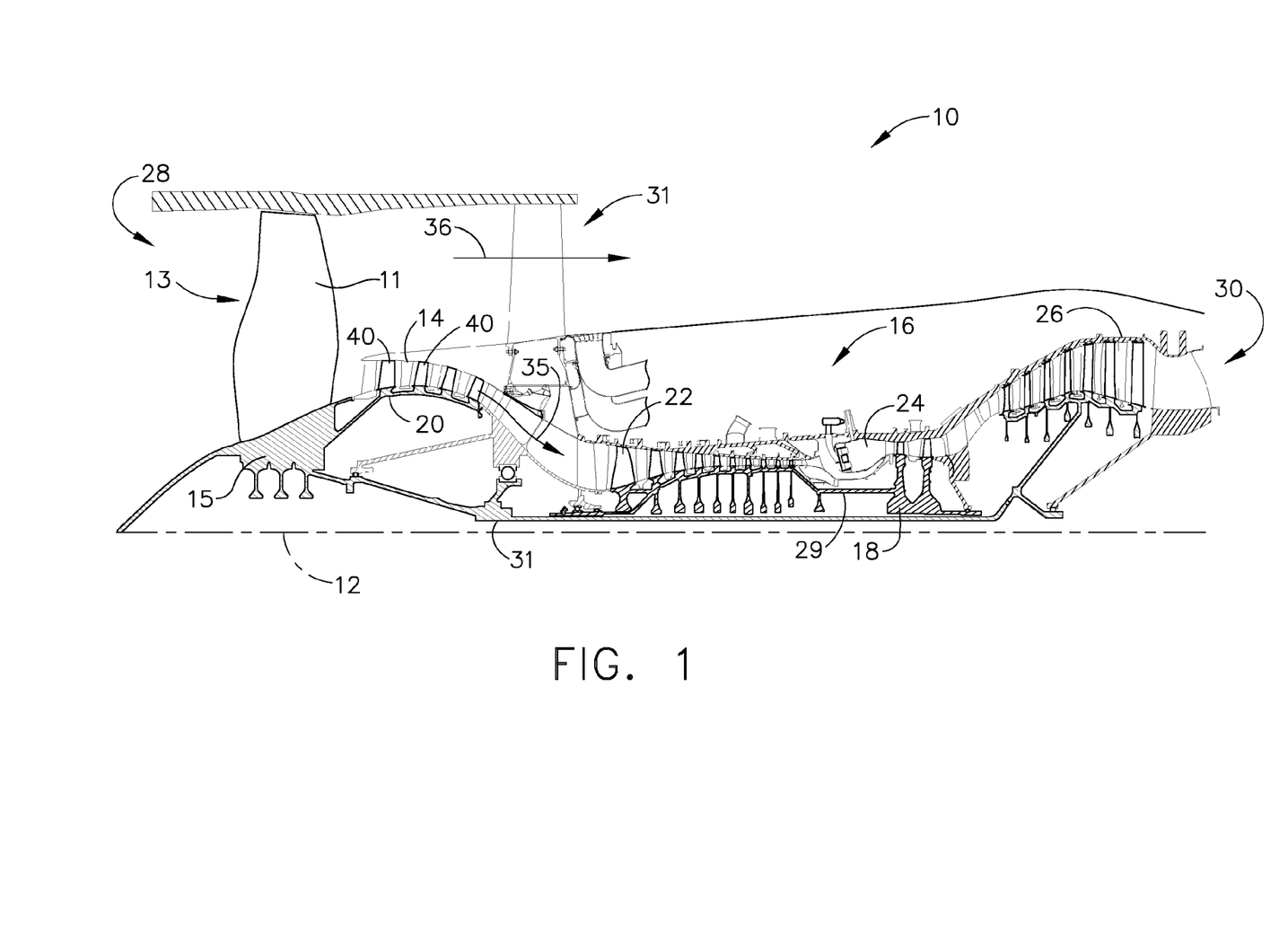
FIG. 1 is a schematic illustration of an exemplary turbine engine.

FIG. 1 is a schematic illustration of an exemplary turbofan gas turbine engine assembly 10 having a centerline axis 12. In the exemplary embodiment, engine assembly 10 includes a fan assembly 13, a booster compressor 14, a core gas turbine engine 16, and a low-pressure turbine 26 that is coupled to fan assembly 13 and booster compressor 14. Fan assembly 13 includes a plurality of rotor fan blades 11 that extend substantially radially outward from a fan rotor disk 15. Core gas turbine engine 16 includes a high-pressure compressor 22, a combustor 24, and a high-pressure turbine 18. Booster compressor 14 includes a plurality of rotor blades 40 that extend substantially radially outward from a compressor rotor disk 20 coupled to a first drive shaft 31. Compressor 22 and high-pressure turbine 18 are coupled together by a second drive shaft 29. Engine assembly 10 also includes an intake side 28, a core engine exhaust side 30, and a fan exhaust side 31.

During operation, air entering engine 10 through intake side 28 is compressed by fan assembly 13. The airflow exiting fan assembly 13 is split such that a portion 35 of the airflow is channeled into booster compressor 14 and a remaining portion 36 of the airflow bypasses booster compressor 14 and core turbine engine 16 and exits engine 10 through fan exhaust side 31. The plurality of rotor blades 40 compress and deliver compressed airflow 35 towards core gas turbine engine 16. Airflow 35 is further compressed by the high-pressure compressor 22 and is delivered to combustor 24. Airflow 35 from combustor 24 drives rotating turbines 18 and 26 and exits engine 10 through exhaust side 30.

Figure 2:
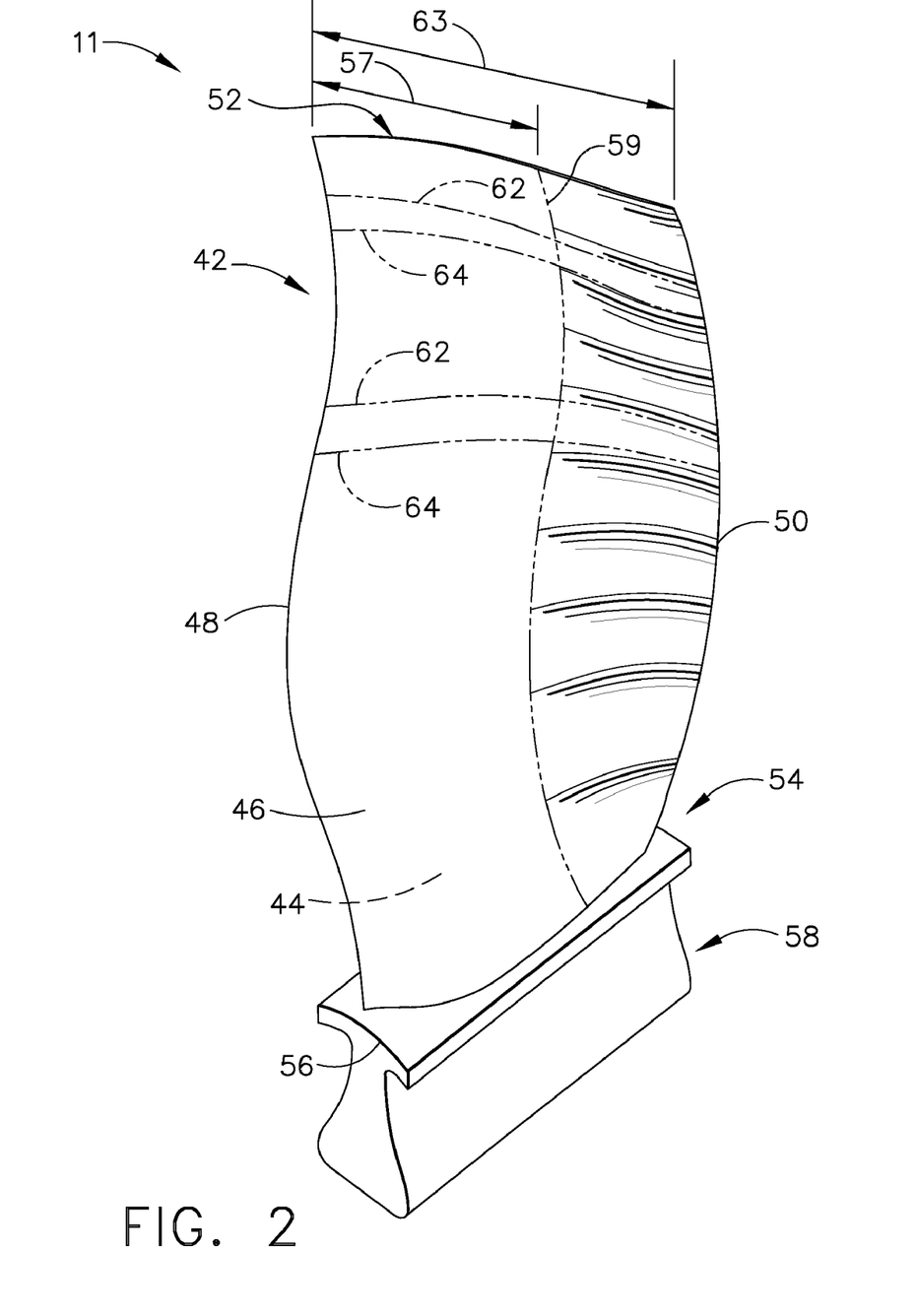
FIG. 2 is a perspective view of an exemplary fan blade that may be used with the engine shown in FIG. 1.
Figure 3:
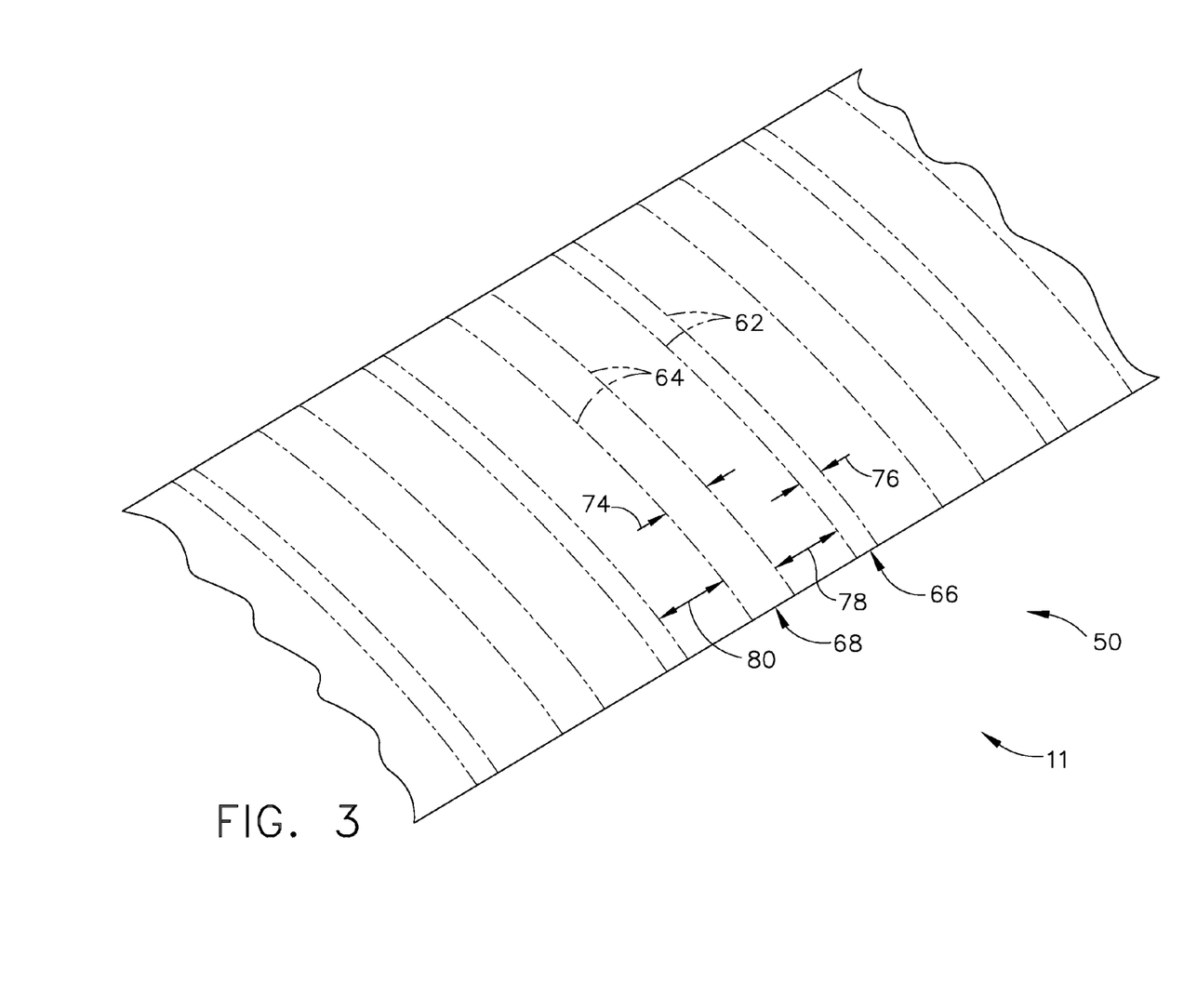
FIG. 3 is an enlarged view of a portion of the fan blade shown in FIG. 2.

FIG. 2 is a perspective view of one embodiment of fan blade 11 that may be used in engine 10 (shown in FIG. 1). FIG. 3 is an enlarged view of a portion of exemplary fan blade 11. In the exemplary embodiment, fan blade 11 includes an airfoil portion 42, a platform 56, and a root portion 54. Alternatively, airfoil portion 42 may be used with, but not limited to, rotor blades, stator blades, and/or nozzle assemblies. In the exemplary embodiment, root portion 54 includes an integral dovetail 58 that enables fan blade 11 to be mounted to rotor disk 15. Airfoil portion 42 includes a first contoured sidewall 44 and a second contoured sidewall 46. Specifically, in the exemplary embodiment, first sidewall 44 defines a pressure side of fan blade 11, and second sidewall 46 defines a suction side of fan blade 11. Sidewalls 44 and 46 are coupled together at a leading edge 48 and at an axially-spaced trailing edge 50. Trailing edge 50 is spaced chord-wise and downstream from leading edge 48. Pressure and suction sides 44 and 46, respectively, each extend longitudinally, or radially outward, from root portion 54 to tip portion 52. As described in more detail below, in the exemplary embodiment, fan blade 11 also includes a camber and thickness variation initiation line 59 extending in a span-wise direction from root portion 54 to tip portion 52. Initiation line 59 is spaced a chord-wise distance 57 from leading edge 48. In one embodiment, distance 57 is between about 0% of a chord length 63 to about 90% of chord length 63. In the exemplary embodiment, distance 57 is about 60% of chord length 63. Alternatively, fan blade 11 may have any conventional form, with or without dovetail 58 or platform portion 56. For example, fan blade 11 may be formed integrally with disk 15 in a blisk-type configuration that does not include dovetail 58 and platform portion 56.

In the exemplary embodiment, airfoil portion 42 includes a plurality of first chord sections 62 and a plurality of second chord sections 64. First chord sections 62 and second chord sections 64 extend generally chord-wise between leading and trailing edges 48 and 50, respectively. Moreover, airfoil 42 includes at least one first chord group 66 including two first chord sections 62 radially-spaced a distance 76. Similarly, airfoil 42 also includes at least one second chord group 68 including two second chord sections 64 radially-spaced a distance 74. Alternatively, at least one of distances 74 and 76 may be substantially zero. In the exemplary embodiment, at least one first chord group 66 is radially-spaced a distance 78 from second chord group 68. Moreover, in the exemplary embodiment, at least one second chord group 68 is radially-spaced a distance 80 from first chord group 66. In the exemplary embodiment, distance 78 is substantially equal to distance 80. Alternatively, distance 78 may not be substantially equal to distance 80. In the exemplary embodiment, each first and second chord section 62 and 64 is formed with chord length 63. Moreover, in the exemplary embodiment, a chord-wise length of chord length 63 varies from root portion 54 to tip portion 52.

Figure 4:
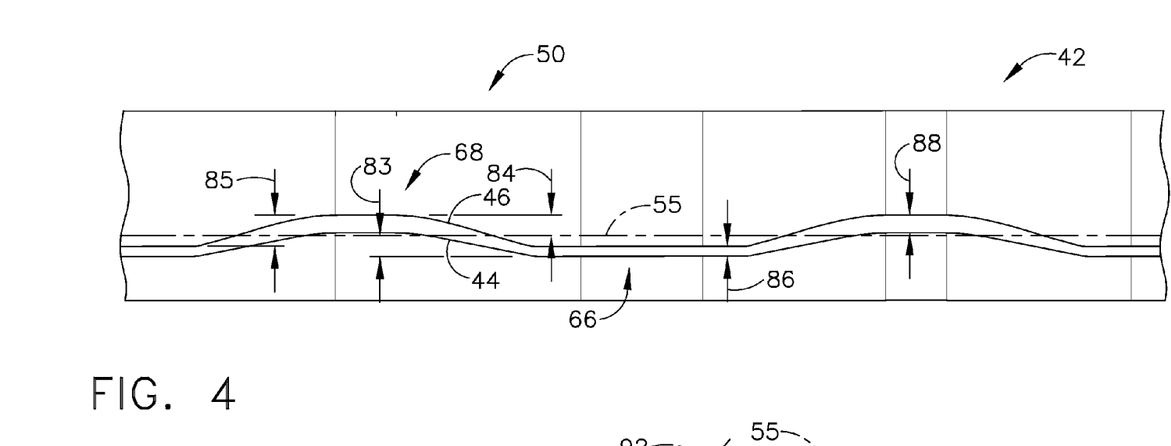
FIG. 4 is a cross-sectional end view of a portion of the fan blade shown in FIG. 2.
Figure 5:
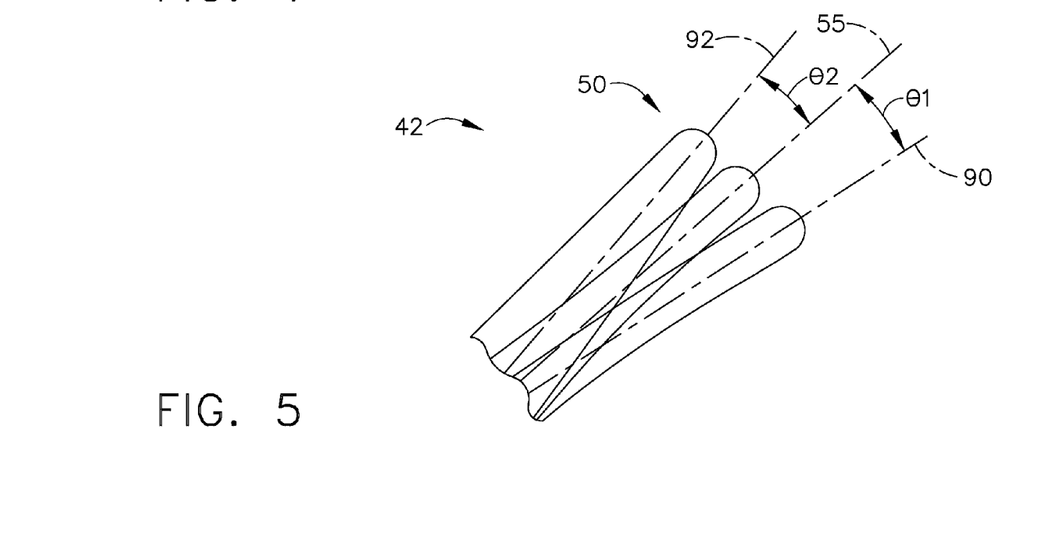
FIG. 5 is a cross-sectional view of a portion of the fan blade shown in FIG. 2.

FIG. 4 is a cross-sectional end view of airfoil trailing edge 50. FIG. 5 is a cross-sectional span-wise view of airfoil 42. In the exemplary embodiment, airfoil 42 is also formed with a mean camber line 55 extending in a chord-wise direction from leading edge 48 to trailing edge 50, such that camber line 55 is equidistant from both suction side 46 and pressure side 44. In the exemplary embodiment, airfoil portion 42 also has a thickness measured between pressure side 44 and suction side 46. Specifically, in the exemplary embodiment, airfoil portion 42 has a first chord thickness 86 defined on at least one first chord group 66 and a second chord thickness 88 defined on at least one second chord group 68. In the exemplary embodiment, first chord thickness 86 is substantially equal to second chord thickness 88 from leading edge 48 to initiation line 59. Moreover, in the exemplary embodiment, thickness 88 is wider than thickness 86 from initiation line 59 to about trailing edge 50. As a result, a wavy, or crenulated, airfoil 42 is formed.

Moreover, in the exemplary embodiment, first and second chord groups 66 and 68 are each formed with a respective camber line 90 and 92. Specifically, first chord camber line 90 is oriented at an angle $\theta_1$ at trailing edge 50 with respect to airfoil mean camber line 55. More specifically, the orientation of first chord camber line 90 causes trailing edge 50, defined on at least one first chord group 66, to extend a distance 83 into a flow path (not shown) of pressure side 44, wherein distance 83 is measured between mean camber line 55 and pressure side 44. Similarly, second chord camber line 92 is oriented at an angle $\theta_2$ at trailing edge 50 with respect to mean camber line 55. More specifically, the orientation of second chord camber line 92 causes trailing edge 50, defined on at least one second chord group 68, to extend a distance 84 into a flow path (not shown) of suction side 46, wherein distance 84 is measured between mean camber line 55 and suction side 46.

In the exemplary embodiment, a distance 85 is measured between suction side 46 of first chord group 66 and suction side 46 of radially adjacent second chord group 68. Moreover, in the exemplary embodiment, distance 85 is further increased by increasing the angular distance at trailing edge 50 between second chord camber line 92 and first chord camber line 90. As described in more detail below, increasing distance 85 facilitates mixing the wake generated by airfoil 42, which facilitates reducing noise and aeromechanical loading on a downstream object. Moreover, in the exemplary embodiment, the term "wake mixing," or forms of the term, refer to, but not limited to, a generation of vortices, varying a trajectory of at least one portion of airflow 36 extending downstream from trailing edge 50, and/or providing thermal uniformity of the wake.

In the exemplary embodiment, the crenulations extend in a span-wise direction from root portion 54 to tip portion 52 of fan blade 11. In an alternative embodiment, the crenulations may partially extend in a span-wise direction along airfoil 42. In another alternative embodiment, airfoil 42 may include at least one group of crenulations extending in a span-wise direction along airfoil 42.

During engine operation, rotor disk 15 and fan blades 11 rotate about axis 12 such that airflow 36 is generated and channeled downstream towards an object such as, but not limited to, a plurality of stationary or rotating airfoils (not shown). More specifically, airflow 36 is channeled over each fan blade 11 towards trailing edge 50. As airflow 36 is channeled over first chord section 62, second chord section 64, and trailing edge 50, counter-rotating vortex pairs are generated. In the exemplary embodiment, the magnitude of the counter-rotating vortex pair is at least partially determined by distance 85. Generally, the greater distances 85 facilitate generating vortices with greater magnitudes. In the exemplary embodiment, the second chord thickness 88 of each second chord group 68 facilitates channeling airflow 36 towards first chord group 66. Moreover, in the exemplary embodiment, the orientation, i.e. $\theta_1$ and $\theta_2$, of second chord group 68 and first chord group 66 also facilitates channeling airflow 36 from second chord group 68 to first chord group 66. More specifically, second chord group 68 facilitates channeling airflow 36 towards first chord group 66, which facilitates generation of vortices.

Moreover, in the exemplary embodiment, the number of first and second chord groups 66 and 68 is proportionate to the number of vortices generated downstream from airfoil 42 and the number of alternating trajectories of airflow 36. Specifically, during operation, airflow 36 is channeled past suction side 46, pressure side 44, and trailing edge 50 over airfoils 42. Each second chord group 68 generates a counter-rotating vortex pair (not shown) as airflow 36 is channeled over trailing edge 50. Moreover, in the exemplary embodiment, airflow 36 channeled over first chord group 66 has a first trajectory and extends downstream into the flow path (not shown) of pressure side 44. Similarly, in the exemplary embodiment, airflow 36 channeled over second chord group 68 has a second trajectory and extends downstream into the flow path (not shown) of suction side 46. In the exemplary embodiment, wake mixing, or the generation of the vortices and the alternating trajectories of airflow 36, facilitates reducing the amplitude of the wake flow, or wake signal, impinging on a downstream object, such that the noise and aeromechanical loading are facilitated to be reduced. Moreover, the wake mixing facilitates reducing the axial distance (not shown) necessary between airfoil 42 and a downstream object. As a result, engine efficiency and performance is facilitated to be improved in comparison to engines using airfoils without crenulations defined on at least one airfoil 42.

Figure 6:
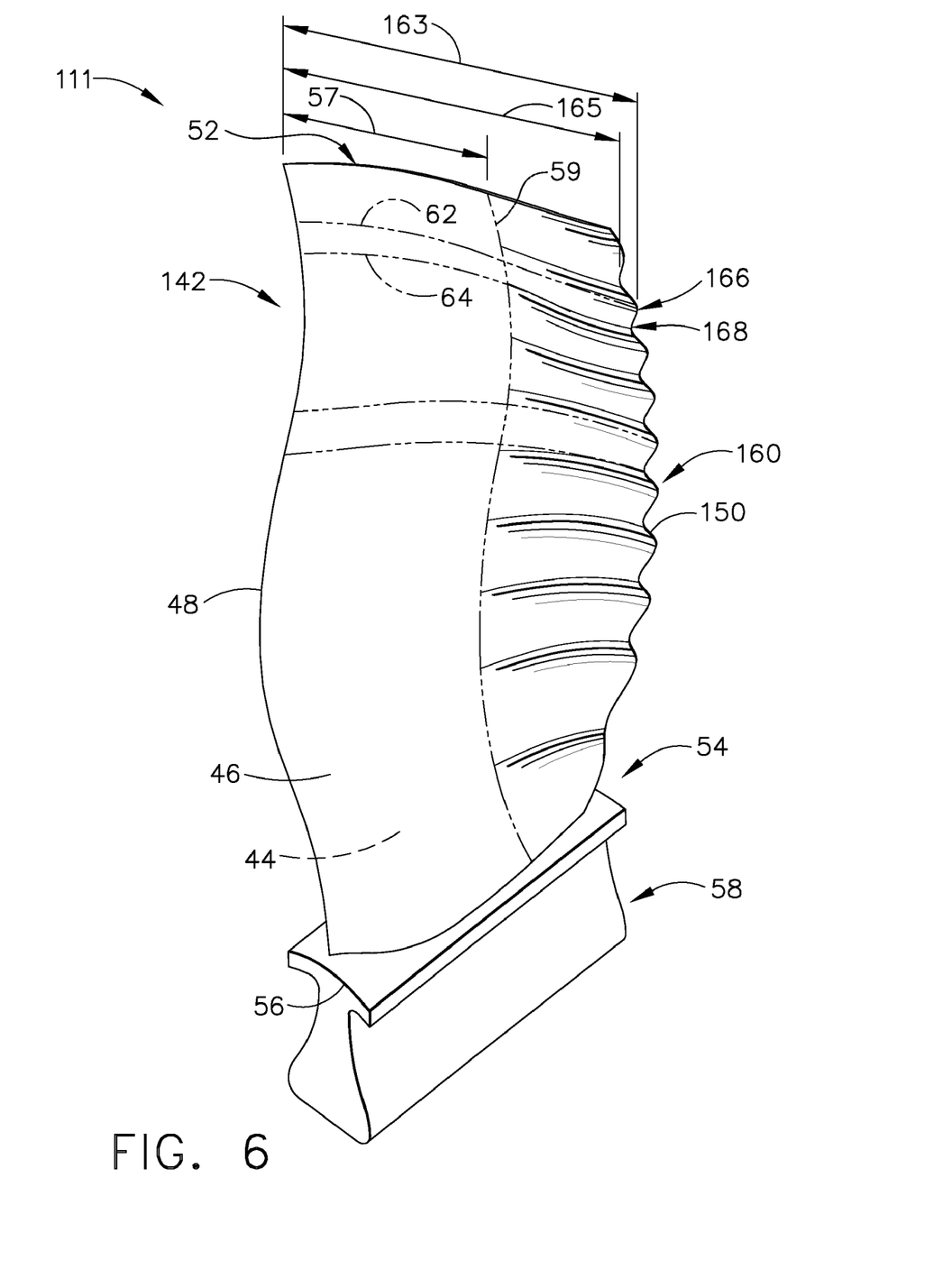
FIG. 6 is a perspective view of another exemplary fan blade that may be used with the engine shown in FIG. 1.
Figure 7:
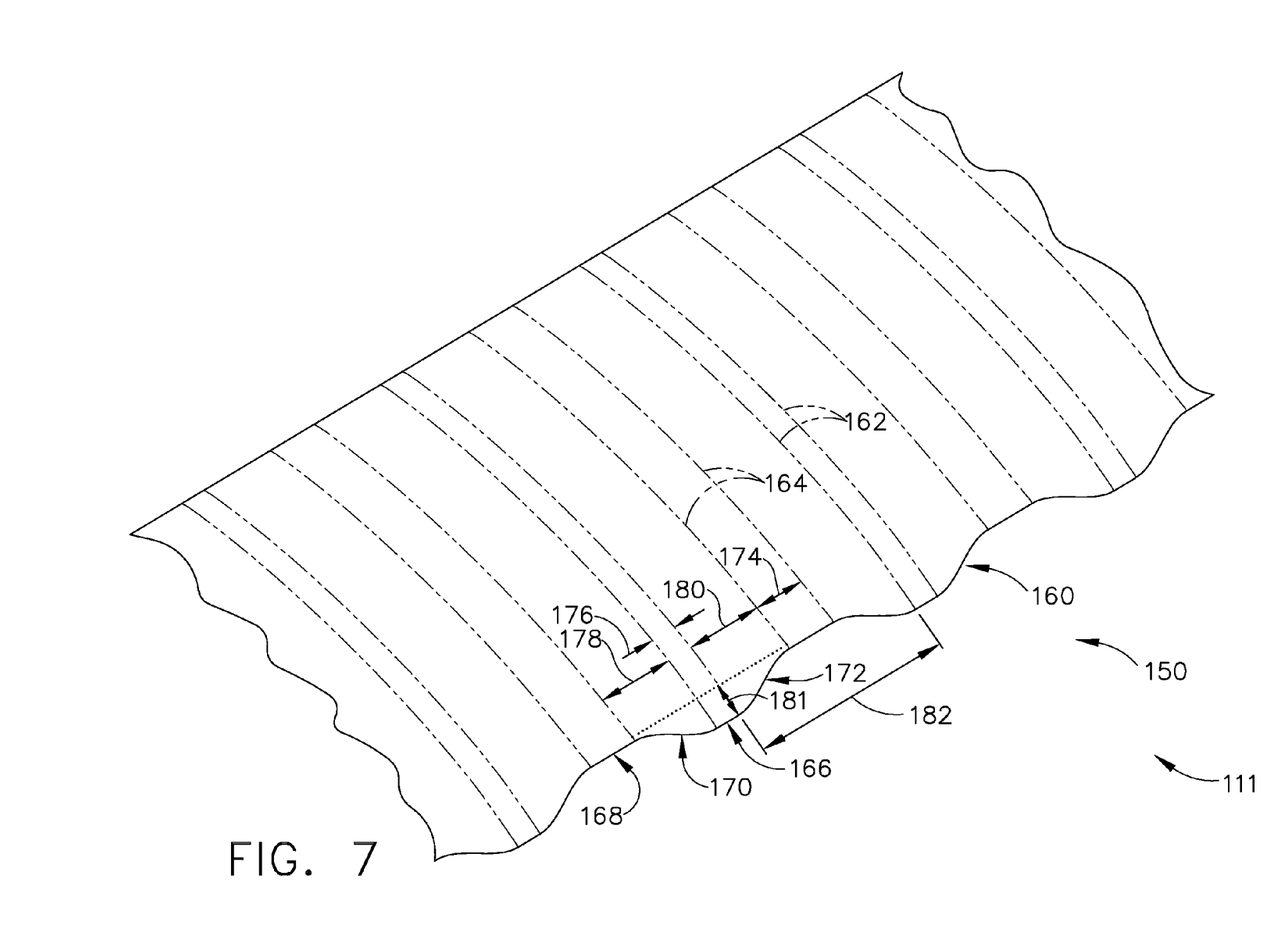
FIG. 7 is an enlarged view of a portion of the fan blade shown in FIG. 6.

FIG. 6 is a perspective view of a second embodiment of fan blade 111 that may be used in engine 10 (shown in FIG. 1). FIG. 7 is an enlarged view of a portion of fan blade 111. FIGS. 6 and 7 illustrate exemplary fan blade 111 that is substantially similar to fan blade 11 shown in FIGS. 2 and 3. As such, reference numbers used to indicate components in FIGS. 2 and 3 will be used to indicate the similar component in FIGS. 6 and 7. In the exemplary embodiment, fan blade 111 includes an airfoil portion 142, a platform 56, and a root portion 54. Alternatively, airfoil portion 142 may be used with, but not limited to, rotor blades, stator blades, and/or nozzle assemblies. In the exemplary embodiment, root portion 54 includes an integral dovetail 58 that enables fan blade 111 to be mounted to rotor disk 15. Airfoil portion 142 includes a first contoured sidewall 44 and a second contoured sidewall 46. Specifically, in the exemplary embodiment, first sidewall 44 is substantially concave and defines a pressure side of fan blade 111, and second sidewall 46 is substantially convex and defines a suction side of fan blade 111. Sidewalls 44 and 46 are coupled together at a leading edge 48 and at an axially-spaced trailing edge 150. Trailing edge 150 is spaced chord-wise and downstream from leading edge 48. Pressure and suction sides 44 and 46, respectively, each extend longitudinally, or radially outward, from root portion 54 to tip portion 52. As described in more detail below, in the exemplary embodiment, fan blade 111 also includes a camber and thickness variation initiation line 59 extending in a span-wise direction from root portion 54 to tip portion 52. Initiation line 59 is spaced a chord-wise distance 57 from leading edge 48. In one embodiment, distance 57 is between about 0% of a chord length 165 to about 90% of chord length 165. In the exemplary embodiment, distance 57 is about 60% of chord length 165. Alternatively, fan blade 111 may have any conventional form, with or without dovetail 58 or platform portion 56. For example, fan blade 111 may be formed integrally with disk 15 in a blisk-type configuration that does not include dovetail 58 and platform portion 56.

In the exemplary embodiment, because of its design, and as explained in more detail below, airfoil 142 includes a plurality of first chord sections 162 and a plurality of second chord sections 164. First chord sections 162 and second chord sections 164 extend generally chord-wise between leading and trailing edges 148 and 150, respectively. As described in more detail below, each first chord section 162 is radially-spaced a distance 180 away from an immediately adjacent second chord section 164. In the exemplary embodiment, at least one first chord section 162 is formed with a chord length 163 that is longer than chord length 165 of at least one second chord section 164. Specifically, in the exemplary embodiment, each first chord section 162 defines a wave tip 166 along trailing edge 150. Similarly, each second chord section 164 defines a wave trough 168 along trailing edge 150. As a result, in the exemplary embodiment, the plurality of alternating second chord sections 164 and first chord sections 162, define a wave-like pattern extending along trailing edge 150.

Moreover, in the exemplary embodiment, waves 160 each include a radially inner edge 170 and a radially outer edge 172. Moreover, trailing edge 150 is defined by a plurality of tip portions 166 and by a plurality of trough portions 168. More specifically, each wave tip 166 is defined on a respective first chord section 162. Similarly, each wave trough 168 is defined on a respective second chord section 164. As a result, in the exemplary embodiment, each wave tip 166 extends, in a chord-wise direction, a distance 181 downstream from each wave trough 168. Moreover, in the exemplary embodiment, each inner edge 170 and outer edge 172 extend generally radially between tip portion 166 and trough portion 168.

In the exemplary embodiment, the number of alternating adjacent first and second chord sections 162 and 164 determines the number of waves 160 defined along trailing edge 150. Specifically, in the exemplary embodiment, second chord section 164 is separated by a distance 178 from each first chord section 162, measured with respect to radially inner edge 170. Similarly, in the exemplary embodiment, each first chord section 162 is separated by a distance 180 from each second chord section 164 measured with respect to radially outer edge 172. Alternatively, distances 178 and 180 may be substantially zero such that inner and outer edges 170 and 172 extends substantially chord-wise between tip portion 166 and trough portion 168. In the exemplary embodiment, waves 160 are substantially symmetrical, such that distances 178 and 180 are approximately equal. As a result, a slope of inner edge 170, with respect to platform 56, is substantially inversely proportional to a slope of outer edge 172. In an alternative embodiment, distance 178 may not be equal to distance 180, resulting in wave 160 that is substantially asymmetrical. In such an embodiment, the slope of inner edge 170 is not substantially inversely proportional to the slope of outer edge 172. In another embodiment, inner edge 170 and outer edge 172 may have any plan shape that extends between tip portion 166 and trough portion 168 including, but not limited to, a straight edge, a sinusoidal edge, and a saw-tooth edge.

In the exemplary embodiment, waves 160 extend in a span-wise direction from root portion 54 to tip portion 52 of fan blade 111. In an alternative embodiment, waves 160 may partially extend in a span-wise direction along airfoil 142. In another embodiment, airfoil 142 may include at least one group of waves 160 extending in a span-wise direction along airfoil 142.

Moreover, in the exemplary embodiment, trough portion 168 has a length 174 that extends generally along trailing edge 150. Similarly, in the exemplary embodiment, tip portion 166 has a length 176 that extends generally along trailing edge 150. Alternatively, length 174 of trough portion 168 may be substantially zero such that trough portion 168 is substantially a transition point defined between inner and outer edges 170 and 172. In another embodiment, length 176 may be substantially zero such that tip portion 166 is substantially a transition point defined between inner and outer edges 170 and 172.

Waves 160 are each fabricated with a pre-determined aspect ratio that represents a ratio of distance 181 with respect to a tip-to-tip distance 182. In the exemplary embodiment, distance 181 is the distance between first chord length 163 (shown in FIG. 2) and second chord length 165 (shown in FIG. 2). Moreover, in the exemplary embodiment, tip-to-tip distance 182 is the span-wise distance between a pair of immediately adjacent wave tips 166. In the exemplary embodiment, distance 181 is between about 0% to about 30% of first chord length 163. In one embodiment, distance 181 is about 10% of first chord length 163. Moreover, in the exemplary embodiment, tip-to-tip distance 182 is between about 0% to about 50% of first chord length 163. In one embodiment, tip-to-tip distance 182 is about 30% of first chord length 163.

Figure 8:
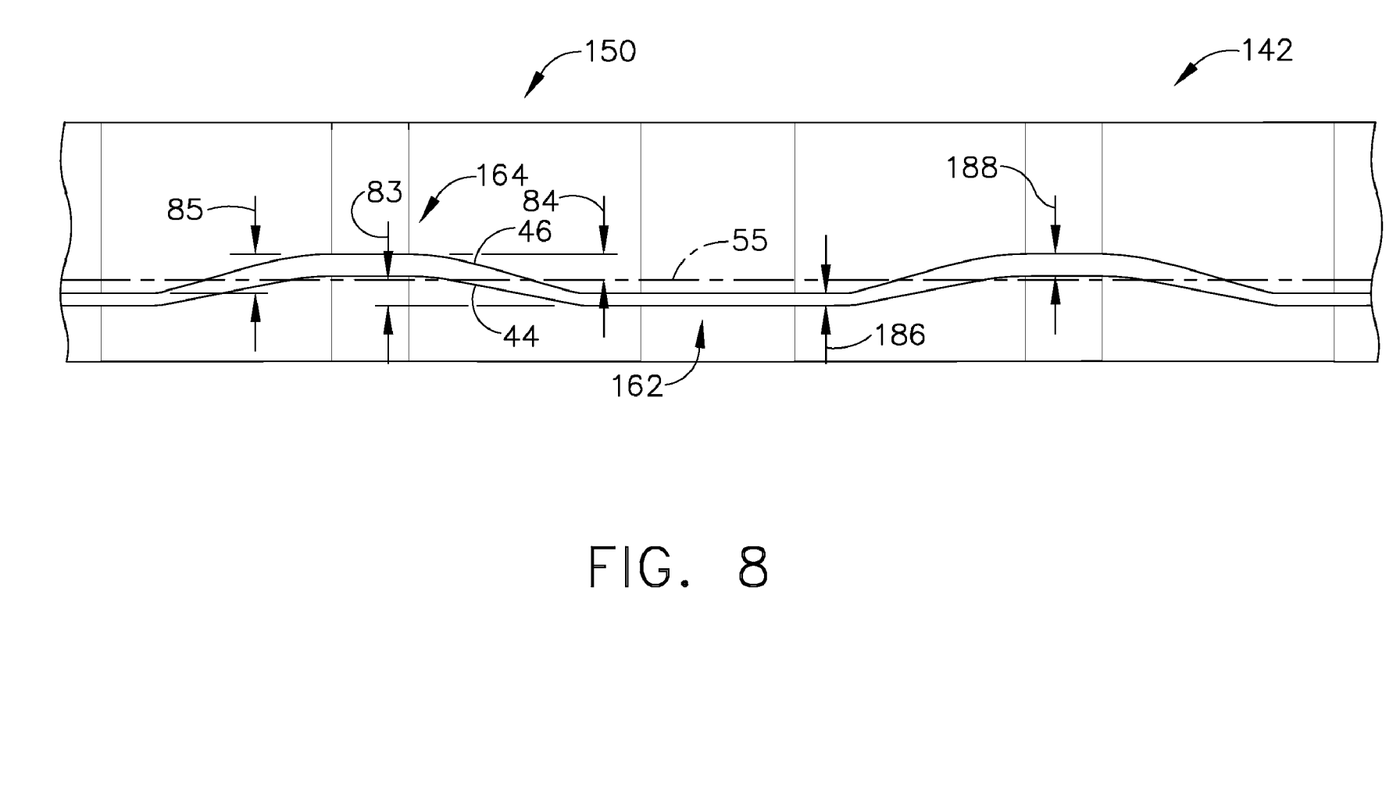
FIG. 8 is a cross-sectional end view of a portion of the fan blade shown in FIG. 6.
Figure 9:
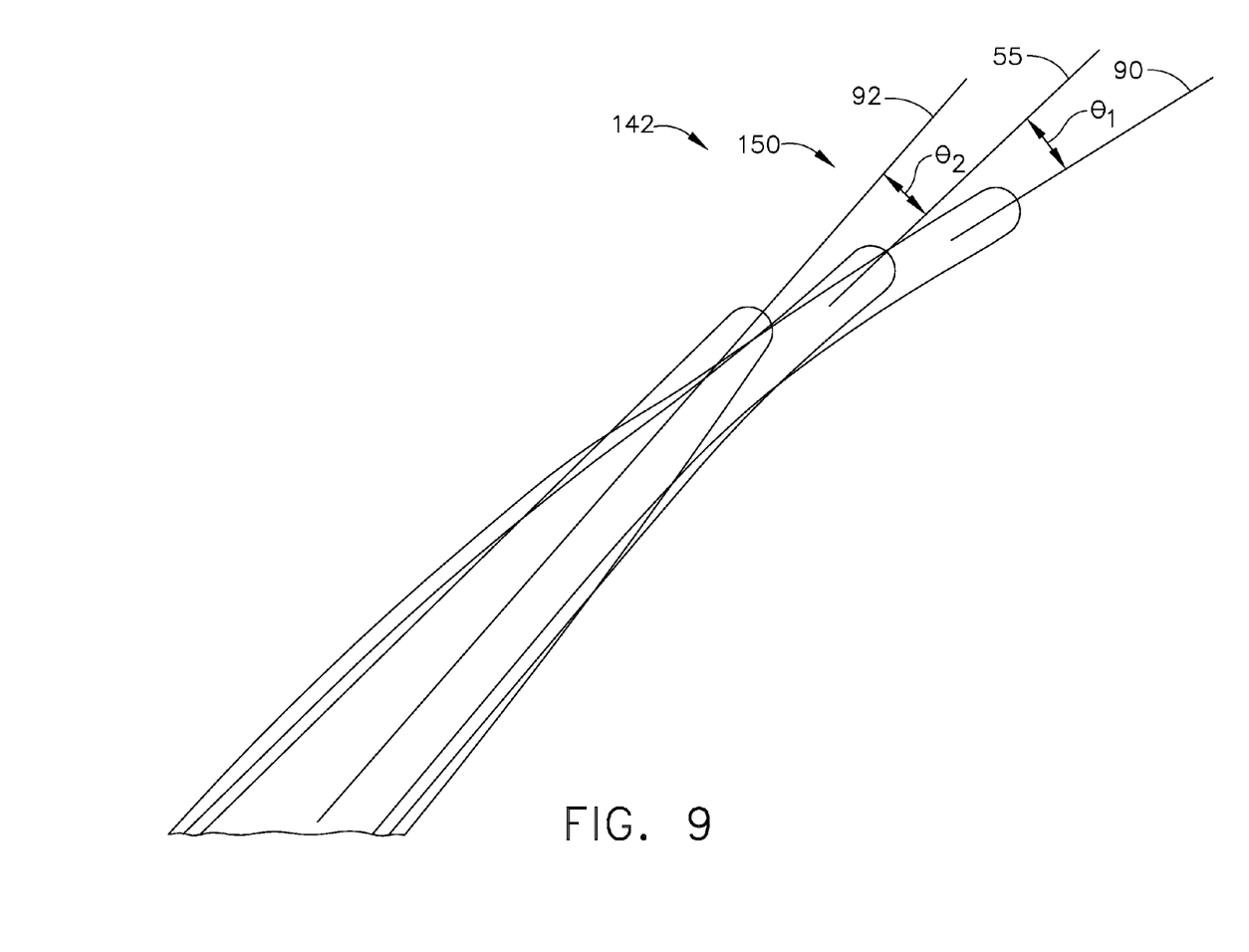
FIG. 9 is a cross-sectional view of a portion of the fan blade shown in FIG. 6.

FIG. 8 is a cross-sectional end view of airfoil trailing edge 150. FIG. 9 is a cross-sectional span-wise view of airfoil 142. FIGS. 8 and 9 illustrate exemplary airfoil trailing edge 150, which is substantially similar to airfoil trailing edge 50 shown in FIGS. 4 and 5. As such, reference numbers used to indicate components in FIGS. 4 and 5 will be used to indicate the similar component in FIGS. 8 and 9. In the exemplary embodiment, airfoil 142 is also formed with a mean camber line 55 extending in a chord-wise direction from leading edge 48 to trailing edge 150, such that camber line 55 is equidistant from both suction side 46 and pressure side 44. In the exemplary embodiment, airfoil 142 also has a thickness measured between pressure side 44 and suction side 46. Specifically, in the exemplary embodiment, airfoil 142 has a first chord thickness 186 defined on at least one first chord section 162, and a second chord thickness 188 defined on at least one second chord section 164. In the exemplary embodiment, first chord thickness 186 is substantially equal to second chord thickness 188 from leading edge 48 to initiation line 59. Moreover, in the exemplary embodiment, thickness 188 is wider than thickness 186 from initiation line 59 to about trailing edge 50. As a result, a crenulated airfoil 42 is formed.

Moreover, in the exemplary embodiment, first chord sections 162 and second chord sections 164 are each formed with a respective camber line 90 and 92. Specifically, first chord camber line 90 is oriented an angle $\theta_1$ at trailing edge 150 with respect to airfoil mean camber line 55. More specifically, the orientation of first chord camber line 90 causes wave tip 166 to extend a distance 83 into a flow path (not shown) of pressure side 44, wherein distance 83 is measured between mean camber line 55 and pressure side 44. Similarly, second chord camber line 92 is oriented at an angle $\theta_2$ with respect to mean camber line 55. More specifically, the orientation of second chord camber line 92 causes wave trough 168 to extend a distance 84 into a flow path (not shown) of suction side 46, wherein distance 84 is measured between mean camber line 55 and suction side 46.

In the exemplary embodiment, a distance 85 is measured between suction side 46 of tip portion 166 and suction side 46 of trough portion 168. Moreover, in the exemplary embodiment, distance 85 defined on trailing edge 150 is further increased by increasing the angular distance at trailing edge 150 between second chord camber line 92 and first chord camber line 90. As described in more detail below, increasing distance 85 facilitates mixing the wake generated by airfoil 42, which facilitates reducing noise and aeromechanical loading on a downstream object. Moreover, in the exemplary embodiment, the term "wake mixing," or forms of the term, refer to, but not limited to, a generation of vortices and altering a trajection of a portion of the wake.

In the exemplary embodiment, the number of waves 160 defined on trailing edge 150 is proportionate to the number of vortices generated downstream from airfoil 142. During operation, airflow 36 is channeled past suction side 46, pressure side 44, and waves 160 over airfoils 142. Each wave 160 generates a counter-rotating vortex pair (not shown) as airflow 36 is channeled over waves 160. Specifically, in the exemplary embodiment, airflow 36 channeled past each radially inner edge 170 generates a first vortex (not shown), and airflow 36 channeled over each radially outer edge 172 generates a counter-rotating second vortex (not shown). As a result, in the exemplary embodiment, each wave 160 generates a pair of counter-rotating vortices extending downstream from trailing edge 150. Moreover, in the exemplary embodiment, the size, shape, orientation, and slope of each wave edge 170 and 172 affects the size of vortices generated. Specifically, the steeper the slope of inner or outer edges 170 or 172, or the smaller the distance 178 or 180, the smaller the size of the generated vortex. Conversely, the shallower the slope of inner or outer edges 170 or 172, or the longer the distance 178 or 180, the wider the vortex is generated downstream from each wave 160. Moreover, in the exemplary embodiment, testing of waves 160 has shown that a vortex becomes less effective after an optimal size has been reached. As described above, waves 160 that are substantially symmetrical generally generate counter-rotating vortex pairs that are substantially equivalent in size and strength. Alternatively, waves 160 that are substantially asymmetrical generally generate counter-rotating vortex pairs which are not substantially equivalent in size or effectiveness.

Moreover, during engine operation, rotor disk 15 and fan blades 111 rotate about axis 12 such that airflow 36 is generated and channeled downstream towards an object such as, but not limited to, a plurality of stationary or rotating airfoils (not shown). More specifically, airflow 36 is channeled over each fan blade 111 towards waves 160. As airflow 36 is channeled over waves 160, counter-rotating vortices are generated by edges 170 and 172, as described above. The sizes and strengths of the counter-rotating vortices are determined by the slopes of inner and outer edges 170 and 172, and by the distance 85 defined between the suction side 46 of each pair of second and first chord sections 164 and 162, respectively.

In the exemplary embodiment, the magnitude of the counter-rotating vortex pair is at least partially determined by distance 85. Generally, the greater distances 85 facilitate generating vortices with greater magnitudes. In the exemplary embodiment, second chord thickness 88 facilitates channeling airflow 36 from second chord section 164 towards first chord section 162. Moreover, in the exemplary embodiment, the orientation, i.e. $\theta_1$ and $\theta_2$, of second chord section 164 and first chord section 162 also facilitates channeling airflow 36 from second chord section 164 to first chord section 162. More specifically, second chord section 164 facilitates channeling airflow 36 from second chord sections 164 towards first chord sections 162, which facilitates generation of vortices.

Moreover, in the exemplary embodiment, airflow 36 channeled over wave tip 166 has a first trajectory and extends downstream from trailing edge 150 into the flow path (not shown) of pressure side 44. Similarly, in the exemplary embodiment, airflow 36 channeled over wave trough 168 has a second trajectory and extends downstream from trailing edge 150 into the flow path (not shown) of suction side 46. In the exemplary embodiment, wake mixing, or the generation of vortices and the alternating trajectories of airflow 36, facilitates reducing the amplitude of the wake flow, or wake signal, impinging on a downstream object, such that the noise and aeromechanical loading are facilitated to be reduced. Moreover, wake mixing facilitates reducing the axial distance (not shown) necessary between airfoil 142 and a downstream object. As a result, engine efficiency and performance is facilitated to be improved in comparison to engines using airfoils without a plurality of wave and crenulations defined on at least one airfoil 142.

Described herein is also a method of fabricating an airfoil. The method includes fabricating at least one airfoil including a suction side and a pressure side coupled together at a leading edge and a trailing edge, wherein the airfoil includes a plurality of first and second chord sections each extending between the trailing and leading edges. At least one of the first chord sections extends outward from the pressure side of the airfoil at the trailing edge, and at least one of the second chord sections extends outward from the suction side of the airfoil at the trailing edge.

The above-described airfoils facilitate reducing the noise and aeromechanical loading generated during engine operation. During engine operation, the airfoils generate a wake that may generate noise and aeromechanical loading when the wake impinges on a downstream object. In one embodiment, the airfoil includes a plurality of first chord groups having a first chord thickness, and a plurality of second chord groups having a second chord thickness. In such an embodiment, the trailing edge defined on at least one of the first chord groups extends outward from a suction side of the airfoil. Similarly, the trailing edge defined on at least one of the second chord groups extends outward from a pressure side of the airfoil. As a result, a wavy, or crenulated, airfoil is formed. The first and second chord groups facilitate wake mixing, or the generating of vortices downstream from the airfoil and alternating trajectories of the airflow. Wake mixing facilitates reducing the magnitude of the wake flow impinging on a downstream object such that the noise and aeromechanical loading are facilitated to be reduced. Moreover, the wake mixing facilitates reducing the axial distance necessary between the airfoils and downstream components. As a result, engine efficiency and performance are facilitated to be improved in comparison to engines using airfoils without crenulations defined on at least one airfoil.

In a second embodiment, each airfoil includes a trailing edge that includes a plurality of wave-shaped projections, or waves. In such an embodiment, the airfoil includes a plurality of first chord sections having a first chord thickness, and a plurality of second chord sections having a second chord thickness. Moreover, in such an embodiment, the plurality of waves defined a plurality of tips and troughs along the trailing edge. As a result a crenulated airfoil is formed. The waves facilitate wake mixing, or the generating of vortices downstream from the airfoil and alternating the trajectories of the airflow. Wake mixing facilitates reducing the magnitude of the wake flow impinging on a downstream object such that the noise and aeromechanical loading are facilitated to be reduced. Moreover, the wake mixing facilitates reducing the axial distance necessary between the airfoils and downstream components. As a result, engine efficiency and performance are facilitated to be improved in comparison to engines using airfoils without a plurality of waves and crenulations defined on at least one airfoil.

Exemplary embodiments of fan blades including airfoils are described above in detail. The airfoils are not limited to the specific embodiments described herein, but rather, may be applied to any type of airfoil that generates a wake flow that may impinge on a downstream object. For example, the airfoils described herein may be used in combination with other blade system components with other engines.

While the invention has been described in terms of various specific embodiments, those skilled in the art will recognize that the invention can be practiced with modification within the spirit and scope of the claims.

What is claimed is:

1. An airfoil comprising:
a suction side and a pressure side coupled together at a leading edge and a trailing edge, said airfoil is defined by a plurality of first chord sections defining at least one first chord length, and a plurality of second chord sections defining at least one second chord length, at least one chord section of said plurality of first chord sections extends outward from said airfoil pressure side at said trailing edge, and at least one chord section of said plurality of second chord sections extends outward from said airfoil suction side at said trailing edge, said trailing edge defines a length between a root portion of said rotor blade and a tip portion of said rotor blade, said trailing edge comprises:
a plurality of spaced-apart wave-shaped projections, each wave-shaped projection of said plurality of wave-shaped projections defines a wave tip, wherein adjacent said wave-shaped projections define a tip-to-tip distance therebetween, the tip-to-tip distance is within a range of values representative of a percentage of the at least one first chord length, wherein said wave-shaped projections are at least one of substantially evenly spaced and unevenly spaced.

2. An airfoil in accordance with claim 1 further comprising a thickness measured between said suction and pressure sides extending from said leading edge to said trailing edge, said airfoil thickness varies in a span-wise direction.

3. An airfoil in accordance with claim 1 wherein said plurality of first chord sections has a first thickness and said plurality of second chord sections has a second thickness, each first chord section of said plurality of first chord sections is defined between each second chord section of said plurality of second chord sections.

4. An airfoil in accordance with claim 1 wherein said trailing edge further comprises at least one trough portion, each said trough portion is defined between at least one pair of said adjacent spaced-apart wave-shaped projections.

5. An airfoil in accordance with claim 1 wherein the first chord length is longer than the second chord length.

6. An airfoil in accordance with claim 1 wherein at least one of said pressure side, suction side, leading edge, and trailing edge is configured to facilitate wake mixing.

7. A rotor assembly for use in an engine, said rotor assembly comprising:
a rotor disk; and
a plurality of rotor blades coupled to said rotor disk, each rotor blade of said plurality of rotor blades comprising an airfoil portion comprising a suction side and a pressure side coupled together at a leading edge and a trailing edge, said airfoil portion is defined by a plurality of first chord sections defining a first chord length, and a plurality of second chord sections defining a second chord length, at least one chord section of said plurality of first chord sections extends outward from said airfoil pressure side and at least one chord section of said plurality of second chord sections extends outward from said airfoil suction side, said trailing edge defines a length between a root portion of said rotor blade and a tip portion of said rotor blade, said trailing edge comprises:

a plurality of spaced-apart wave-shaped projections, each wave-shaped projection of said plurality of wave-shaped projections defines a wave tip, wherein adjacent said wave-shaped projections define a tip-to-tip distance therebetween, the tip-to-tip distance is within a range of values representative of a percentage of the first chord length, wherein said wave-shaped projections are at least one of substantially evenly spaced and unevenly spaced.

8. A rotor assembly in accordance with claim 7 wherein the first chord length is longer than the second chord length.

9. A rotor assembly in accordance with claim 7 wherein said trailing edge further comprises at least one trough portion defined between at least one pair of adjacent spaced-apart wave-shaped projections.

10. A rotor assembly in accordance with claim 7 wherein the airfoil further comprises a thickness measured between said suction and pressure sides extending from said leading edge to said trailing edge, said airfoil thickness varies in a span-wise direction.

11. A rotor assembly in accordance with claim 7 wherein said plurality of first chord sections has a first thickness and said plurality of second chord sections has a second thickness, each first chord section of said plurality of first chord sections is defined between each second chord section of said plurality of second chord sections.

12. A rotor assembly in accordance with claim 7 wherein at least one of said pressure side, suction side, leading edge and trailing edge is configured to facilitate wake mixing.

13. A rotor assembly, said rotor assembly comprising:
  a rotor disk; and
  a plurality of rotor blades coupled to said rotor disk, each rotor blade of said plurality of rotor blades comprising an airfoil portion comprising a suction side and a pressure side coupled together at a leading edge and a trailing edge, said airfoil portion is defined by a plurality of first chord sections defining a first chord length, and a plurality of second chord sections defining a second chord length, at least one chord section of said plurality of first chord sections extends outward from said airfoil pressure side and at least one chord section of said plurality of second chord sections extends outward from said airfoil suction side, said trailing edge defines a length between a root portion of said rotor blade and a tip portion of said rotor blade, said trailing edge comprises:
    a plurality of crenulations, each crenulation of said plurality of crenulations defines a wave tip, wherein adjacent said crenulations define a tip-to-tip distance therebetween, the tip-to-tip distance is within a range of values representative of a percentage of the first chord length, wherein said crenulations are at least one of substantially evenly spaced and unevenly spaced.

14. A rotor assembly in accordance with claim 13 wherein the first chord length is longer than the second chord length.

15. A rotor assembly in accordance with claim 13 wherein wake mixing downstream of said trailing edge is facilitated by at least one of:
  a number of said plurality of first chord sections and said plurality of second chord sections; and
  a distance measured on said airfoil suction side between a chord section of said plurality of first chord sections and a radially adjacent chord section of said second chord sections.

* * * * *

UNITED STATES PATENT AND TRADEMARK OFFICE
CERTIFICATE OF CORRECTION

| | | |
|---|---|---|
| PATENT NO. | : 8,083,487 B2 | |
| APPLICATION NO. | : 11/774762 | |
| DATED | : December 27, 2011 | |
| INVENTOR(S) | : Wood et al. | |

It is certified that error appears in the above-identified patent and that said Letters Patent is hereby corrected as shown below:

In Column 10, Line 20, after "edge defines a length between a root portion of" delete "said" and insert -- a --, therefor.

Signed and Sealed this
Twenty-ninth Day of January, 2013

David J. Kappos
*Director of the United States Patent and Trademark Office*